(No Model.)

R. J. GODBERY.
ROLLER SPROCKET FOR BICYCLES.

No. 511,012. Patented Dec. 19, 1893.

WITNESSES:
Henry Graban
Ricardo

INVENTOR
Richard J. Godbery.
by W. R. Stringfellow
ATTORNEY

THE NATIONAL LITHOGRAPHING COMPANY,
WASHINGTON, D. C.

UNITED STATES PATENT OFFICE.

RICHARD J. GODBERY, OF NEW ORLEANS, LOUISIANA.

ROLLER-SPROCKET FOR BICYCLES.

SPECIFICATION forming part of Letters Patent No. 511,012, dated December 19, 1893.

Application filed January 9, 1893. Serial No. 457,829. (No model.)

*To all whom it may concern:*

Be it known that I, RICHARD JOSEPH GODBERY, a citizen of the United States, residing at New Orleans, in the parish of Orleans and State of Louisiana, have invented certain new and useful Improvements in Roller-Sprockets for Bicycles or other Devices; and I do declare the following to be a full, clear, and exact description of the invention, such as will enable others skilled in the art to which it appertains to make and use the same.

My invention relates to an improvement in a roller sprocket for bicycles or other devices, and its novelty will be fully understood from the following description and claim, when taken in connection with the annexed drawings.

The object of my invention is to provide a sprocket wheel that will overcome the friction of a chain. I attain this object by the mechanism illustrated in the accompanying drawings, in which—

Figure 1:
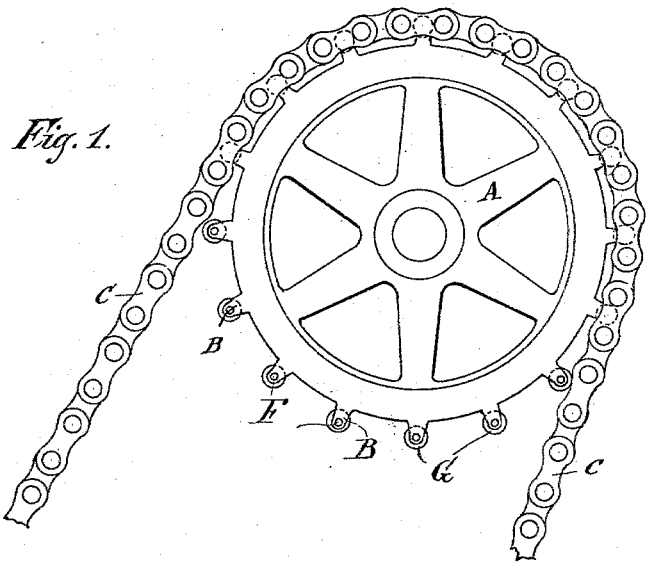
Figure 2:
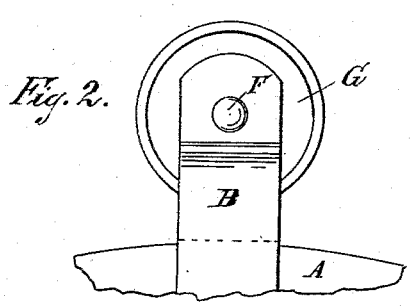
Figure 3:
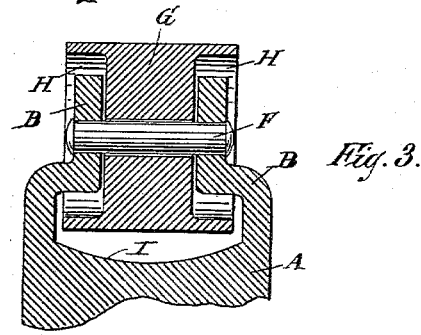

Figure 1 is a side view showing chain passing over sprocket wheel. Fig. 2 is a detail side view showing a single roller. Fig. 3 is a transverse sectional view of Fig. 2.

Similar letters refer to similar parts throughout the several views.

The wheel A, has projections or sprockets B formed integral therewith upon each edge of the periphery. These sprockets are first bent toward each other from the edge of the periphery of the said wheel, then at right angles outwardly from the wheel leaving the cut out I, and a space between the sprockets. Near the outer ends of the sprockets are formed bearings for the spindles E, of the anti-friction rollers G. The anti-friction rollers are inserted in the said space between the sprockets, each roller having concave ends, and a flanged periphery encircling the sprockets. The wheel with my improved form of sprockets carrying the rollers operates the chain C, with much less friction, and therefore requires less power to drive the said wheel than the ordinary sprocket wheel.

I am aware that rollers have been journaled in arms or sprockets projecting from the periphery of a chain wheel, and I therefore lay no broad claim thereto, but What I do claim, and desire to secure by Letters Patent, is—

A sprocket wheel having projections formed integral therewith upon each edge of its periphery and the cut out portion I, said projections being bent toward each other from said edges and then at right angles outwardly from the wheel, leaving a space between the projections, and the anti-friction roller having concave ends, each having a flanged periphery encircling the projections, said projections having bearings for the spindles of said rollers near their outer ends, as set forth.

In testimony whereof I affix my signature in presence of two witnesses.

RICHARD J. GODBERY.

Witnesses:
L. J. GODBERY,
RICARDO DEE.